US012752215B2

(12) United States Patent
Han et al.

(10) Patent No.: US 12,752,215 B2
(45) Date of Patent: Oct. 6, 2026

(54) EVAPORATOR AND SEPARATION METHOD USING THE SAME

(71) Applicant: Hanwha Solutions Corporation, Seoul (KR)

(72) Inventors: Junhee Han, Daejeon (KR); Shinbeom Lee, Daejeon (KR); Gyeongseon Jeong, Daejeon (KR); Keedo Han, Daejeon (KR)

(73) Assignee: Hanwha Solutions Corporation, Seoul (KR)

( * ) Notice: Subject to any disclaimer, the term of this patent is extended or adjusted under 35 U.S.C. 154(b) by 282 days.

(21) Appl. No.: 18/551,039

(22) PCT Filed: Feb. 21, 2022

(86) PCT No.: PCT/KR2022/002521
§ 371 (c)(1),
(2) Date: Sep. 18, 2023

(87) PCT Pub. No.: WO2022/196959
PCT Pub. Date: Sep. 22, 2022

(65) Prior Publication Data

US 2024/0157267 A1 May 16, 2024

(30) Foreign Application Priority Data

Mar. 16, 2021 (KR) ........................ 10-2021-0034018

(51) Int. Cl.
*B01D 1/00* (2006.01)

(52) U.S. Cl.
CPC .......... *B01D 1/0011* (2013.01); *B01D 1/0064* (2013.01)

(58) Field of Classification Search
CPC ...... B01D 1/0011; B01D 1/0064; B01D 3/14; B01D 3/343; B01D 1/30; B01D 3/148; B01D 3/32
See application file for complete search history.

(56) References Cited

U.S. PATENT DOCUMENTS 4,199,409 A 4/1980 Skraba
4,406,743 A * 9/1983 MacQueen ............ C10G 29/06 196/100

(Continued)

FOREIGN PATENT DOCUMENTS

CN 103864587 A 6/2014
CN 111194300 A 5/2020

(Continued)

OTHER PUBLICATIONS

The extended European Search Report dated Feb. 25, 2025, of the corresponding European Patent Application.

*Primary Examiner* — Dung H Bui
(74) *Attorney, Agent, or Firm* — Harvest IP Law, LLP

(57) ABSTRACT

An evaporator according to an exemplary embodiment includes: a column in which a plurality of packings are stacked; an upper inlet, a middle inlet, and a lower inlet provided in an upper portion, a middle portion, and a lower portion of the column, respectively; an upper outlet and a lower outlet provided in the upper portion and the lower portion of the column, respectively; a pump connected to the lower outlet; and a heater connected between the pump and the middle inlet.

9 Claims, 6 Drawing Sheets

(56) References Cited

U.S. PATENT DOCUMENTS

| | | | | | |
|---|---|---|---|---|---|
| 4,501,657 | A * | 2/1985 | Nollkamper | C10G 7/00 | 203/1 |
| 5,958,191 | A * | 9/1999 | Patel | C07C 29/76 | 203/99 |
| 6,001,220 | A | 12/1999 | Hillstrom | | |
| 6,514,387 | B1 | 2/2003 | Emmrich | | |
| 7,435,319 | B2 | 10/2008 | Deibele | | |
| 8,058,465 | B2 * | 11/2011 | Fukuoka | C07C 68/065 | 558/277 |
| 9,714,388 | B1 * | 7/2017 | Joshi | B01D 1/10 | |
| 2003/0181772 | A1 | 9/2003 | Meyer | | |
| 2004/0060810 | A1 | 4/2004 | Asano | | |
| 2009/0032389 | A1 | 2/2009 | Deibele | | |
| 2009/0266107 | A1 * | 10/2009 | Singh | F25J 3/0238 | 62/617 |
| 2011/0308931 | A1 * | 12/2011 | Tamminen | B01D 1/06 | 203/88 |
| 2012/0004473 | A1 * | 1/2012 | Lee | B01D 3/141 | 568/913 |
| 2017/0152341 | A9 * | 6/2017 | Sato | C08G 63/54 | |
| 2017/0152345 | A1 * | 6/2017 | Hofmann | B01D 3/148 | |
| 2017/0368471 | A1 * | 12/2017 | Zheng | C02F 1/048 | |
| 2024/0009590 | A1 * | 1/2024 | Sleijster | B01D 53/18 | |

FOREIGN PATENT DOCUMENTS

| | | | |
|---|---|---|---|
| CN | 112209352 | A | 1/2021 |
| EP | 1576995 | A2 | 9/2005 |
| EP | 3046642 | B1 | 11/2017 |
| KR | 19980032389 | A | 7/1998 |
| KR | 20100105500 | A | 9/2010 |
| KR | 10-2016-0021889 | A | 2/2016 |
| KR | 20170026555 | A | 3/2017 |
| KR | 20190098198 | A | 8/2019 |

* cited by examiner

EVAPORATOR AND SEPARATION METHOD USING THE SAME

CROSS-REFERENCE TO RELATED APPLICATION

This application is a National Stage of International Application No. PCT/KR2022/002521 filed on Feb. 21, 2022 claiming priority based on Korean Patent Application No. 10-2021-0034018 filed in the Korean Intellectual Property Office on Mar. 16, 2021, the entire contents of which are incorporated herein by reference.

TECHNICAL FIELD

The present disclosure relates to an evaporator and a separation method using the same.

BACKGROUND ART

In general, in order to produce a compound, a plurality of substances are mixed and subjected to a plurality of reactions.

During the plurality of reaction processes, unnecessary substances are generated, which reduce production efficiency.

Therefore, unnecessary reactants are removed during an intermediate process. In a gas phase reactor, some liquid-phase reactants including a compound are separated for removal and vaporization to participate in the reaction using a single evaporator or a device combining a distillation column and a single evaporator.

The single evaporator requires a small amount of heat, but has low heavy removal efficiency of about 10%. On the other hand, the device combining a distillation column and a single evaporator has high heavy removal efficiency of 90% or more, but requires a large amount of heat.

DISCLOSURE

Technical Problem

The present disclosure attempts to provide an evaporator capable of increasing heavy removal efficiency while reducing a usage amount of heat and a separation method using the same.

Technical Solution

An exemplary embodiment of the present invention provides an evaporator including: a column in which a plurality of packings are stacked; an upper inlet, a middle inlet, and a lower inlet provided in an upper portion, a middle portion, and a lower portion of the column, respectively; an upper outlet and a lower outlet provided in the upper portion and the lower portion of the column, respectively; a pump connected to the lower outlet; and a heater connected between the pump and the middle inlet.

The evaporator may further include a first supply unit and a second supply unit supplying target substances to the column, wherein the first supply unit is connected to the upper inlet, and the second supply unit is connected to the lower inlet.

The target substances to be separated may be stored in the first supply unit, and the second supply unit may include a first storage tank storing the target substances and a second storage tank storing gas to be supplied together with the target substances.

The evaporator may further include: a first heater positioned between the first supply unit and the column; and a second heater positioned between the second supply unit and the column.

The column may include: a first column to which the target substances are supplied from the first supply unit through the upper inlet, and a second column positioned below the first column.

The first column and the second column may include a plurality of structured packings, and the number of packing stages of the first column and the number of packing stages of the second column may be different from each other.

Substances discharged through the lower outlet may be supplied to the column through the middle inlet after passing through the pump and the heater.

Another exemplary embodiment of the present invention provides a separation method using the evaporator described above, the separation method including: injecting target substances into the upper inlet and the lower inlet of the evaporator; and injecting substances discharged through the lower outlet after passing through the column into the middle inlet via the pump and the heater, wherein in the injecting of the target substances into the upper inlet and the lower inlet, gas is injected together with the target substances into the lower inlet.

The target substances may include 2-EHEL and heavies.

The gas may include at least one of hydrogen, methane, carbon dioxide, and carbon monoxide.

The heater between the first supply unit and the column may heat the substances to be discharged to a temperature of 70° C. to 122° C., and the heater between the second supply unit and the column may heat the substances to be discharged to a temperature of 105° C. to 115° C.

Advantageous Effects

By using the evaporator according to an exemplary embodiment of the present disclosure, it is possible to increase efficiency of separating 2-EHEL and removing heavies.

MODE FOR INVENTION

Hereinafter, exemplary embodiments of the present disclosure will be described in detail with reference to the accompanying drawings, so that those having ordinary knowledge in the art to which the present disclosure pertains may easily carry out the present disclosure. The present disclosure may be implemented in various different forms and is not limited to the exemplary embodiments described herein.

Hereinafter, exemplary embodiments of the present disclosure will be described in detail with reference to the drawings.

Figure 1:
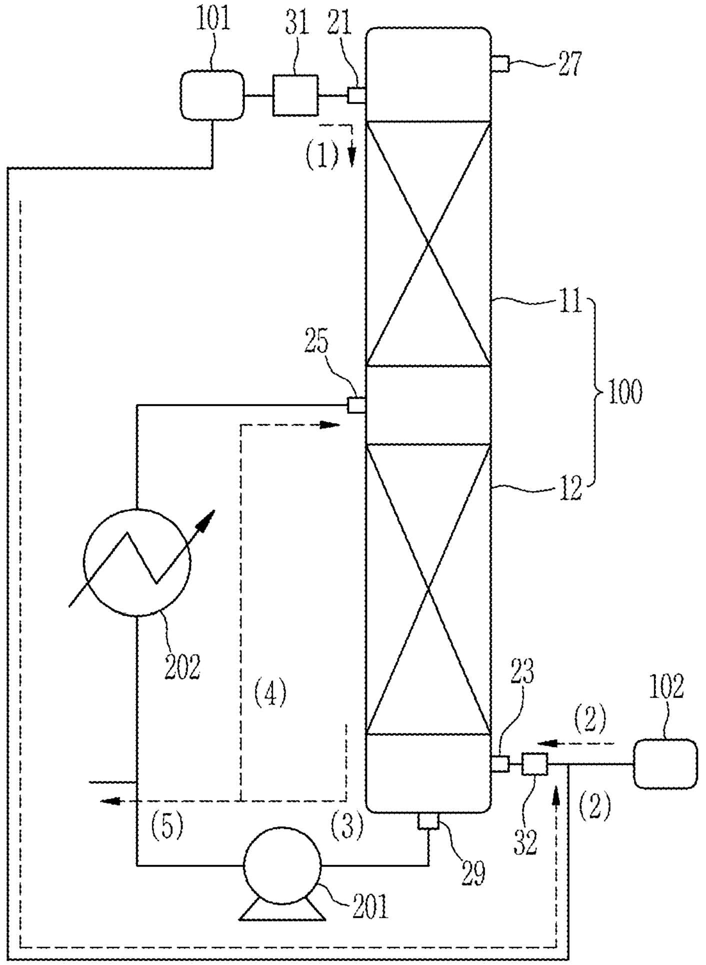
FIG. 1 is a schematic configuration diagram of an evaporator according to an exemplary embodiment of the present disclosure.

FIG. 1 is a schematic configuration diagram of an evaporator according to an exemplary embodiment of the present disclosure.

As illustrated in FIG. 1, the evaporator according to an exemplary embodiment of the present disclosure includes a column 100, and a pump 201 and a heater 202 connected to the column 100.

The column 100 may be configured as a stripping column to promote contact with liquid, and multiple trays may be arranged in the column 100 or the column 100 may include random or structured packings. The structure inside the column is well known, and thus the detailed description thereof will be omitted.

The column 100 includes a first column 11 positioned in an upper portion of the column 100 and a second column 12 positioned below the first column 11. For example, each of the first column 11 and the second column 12 may include 10-stage packings.

Target substances to be separated, for example, 2-Ethyl-2-hexenal (2-EHEL) to be evaporated upward and heavies to be separated downward, may be injected into the column 100. The heavies may include substances having higher boiling points than 2-EHEL, such as substances containing 9 or more carbons (C) and substances containing sulfur (S).

The column 100 is formed to have an upper inlet 21, a lower inlet 23, and a middle inlet 25. The upper inlet 21 may be positioned above the first column 11, the lower inlet 23 may be positioned below the second column 12, and the middle inlet 25 may be positioned between the first column 11 and the second column 12.

The target substances may be stored in a liquid state in a first storage tank 101 and injected through the upper inlet 21 and the lower inlet 23 of the column 100.

The first storage tank 101 for supplying the target substances and a second storage tank 102 for injecting gas may be connected to the column 100.

The target substances stored in the first storage tank 101 may be injected into the upper inlet 21 (see dotted line (1)), and gas may be injected together with the target substances into the lower inlet 23 (see dotted lines (2)).

Some of the target substances injected through the upper inlet 21 are evaporated through material exchange and heat exchange while passing through the first column 11 and the second column 12 and discharged as gas through an upper outlet 27, and the others of the target substances that are not discharged as gas, some of 2-EHEL and substances having higher boiling points than 2-EHEL, are discharged to the outside through a lower outlet 29 (see dotted line (3)).

Heaters may be connected to the upper inlet and the lower inlet. A first heater 31 connected to the upper inlet may heat the injected substances to a temperature of 70° C. to 122° C., and a second heater 32 connected to the lower inlet may heat the injected substances to a temperature of 105° C. to 115° C.

Some of the target materials supplied through the lower inlet 23 may be evaporated and discharged through the upper outlet 27 together with the injected gas. Therefore, the gas injected together with the target substances through the lower inlet 23 may be light gas such as hydrogen, methane, butane, carbon monoxide, or carbon dioxide to easily evaporate the target substances upward. The target substances supplied through the lower inlet 23 are evaporated and moved upward together with the injected gas and are discharged through the upper outlet 27, and the target substances that are not discharged as gas, some of 2-EHEL and substances having higher boiling points than 2-EHEL, are discharged out of the column through the lower outlet 29.

Meanwhile, the target substances that are not discharged by evaporation among the target substances supplied through the upper inlet 21 and the target substances that are not discharged by evaporation among the target substances supplied through the lower inlet 23, some of 2-EHEL and substances having higher boiling points than 2-EHEL, are discharged out of the column 100 (see dotted line (3)).

Some of the target substances discharged out of the column 100 are discharged out of the column through the pump 201 (see dotted line (5)), and the others of the target substances discharged out of the column 100 are supplied to the heater 202 (see dotted line (4)). The target substances having passed through the heater 202 are injected into the middle inlet 25 of the column 100. At this time, the substances discharged out of the column and the substances injected back into the column 100 through the middle inlet 25 have the same composition, and may be supplied separately at a flow rate ratio.

The middle inlet 25 is positioned between the first column 11 and the second column 12, and the target substances injected into the middle inlet 25 are supplied to the second column 12.

The target substances injected through the middle inlet 25 is supplied in a heated state by passing through the heater 202. At this time, the target substances injected through the middle inlet may be injected after being heated to a temperature of 122° C. to 140° C. in order to supply heat to the substances inside the second column 12 and increase the temperatures of the substances. Therefore, the substances in the second column supplied with heat can be evaporated more easily and pass through the first column 11 while being evaporated in a state where their temperatures rise relatively.

The target substances injected through the middle inlet undergo material exchange and heat exchange with the target substances supplied to the first column 11 through the upper inlet 21, such that the evaporation of the target substances supplied through the upper inlet 21 can be more easily induced.

As described above, in an exemplary embodiment of the present disclosure, by separating the inside of the column 100 into the first column 11 and the second column 12, and then heating the target substances discharged to the outside and injecting the heated target substances between the first column 11 and the second column 12, the target substances can be separated from each other more quickly and more efficiently.

Figure 2:
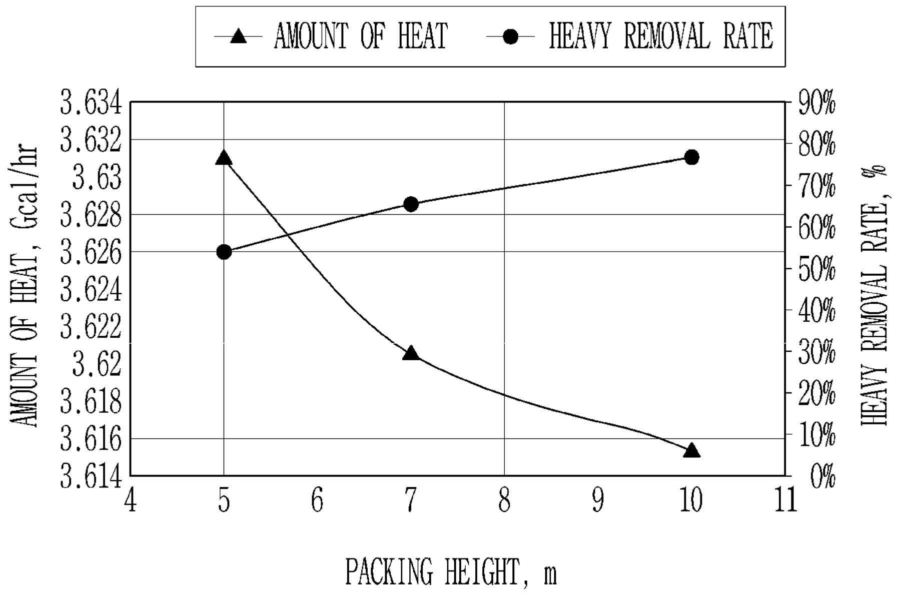
FIG. 2 is a graph illustrating an amount of heat (duty) and a heavy removal rate depending on a packing height in the evaporator according to an exemplary embodiment of the present disclosure.

FIG. 2 is a graph illustrating an energy consumption (duty) and a heavy removal rate depending on a packing height in the evaporator according to an exemplary embodiment of the present disclosure.

In FIG. 2, concerning the packings stacked in the column, a packing height equivalent to theoretical plate (HETP) is 0.5 m, a packing diameter is 1.6 m, and a ratio of the number of cycle feed stages to the number of total stages is 0.7. The ratio of the number of cycle feed stages to the number of total stages represents a ratio of the first column to the total number of stages, and the ratio of the number of cycle feed stages to the number of total stages being 0.7 indicates that the number of stages in the first column is different from the number of stages in the second column. In a case where the total number of stages is 20, the ratio being 0.7 indicates that the first column has 14 stages and the second column has 6 stages.

The target substances were discharged through the lower outlet at a flow rate of 390 kg/hr, and the target substances supplied through the upper inlet included 2-EHEL, heavies, and other substances. At this time, a ratio of an amount of 2-EHEL supplied through the upper inlet to an amount of 2-EHEL injected through the lower inlet was 0.42.

Referring to FIG. 2, it was confirmed that as the height increased from 5 m to 10 m, the amount of heat (duty) decreased and the heavy removal rate increased. That is, it can be seen that as the height increases, the amount of heat decreases and thus the energy consumption decreases.

Figure 3:
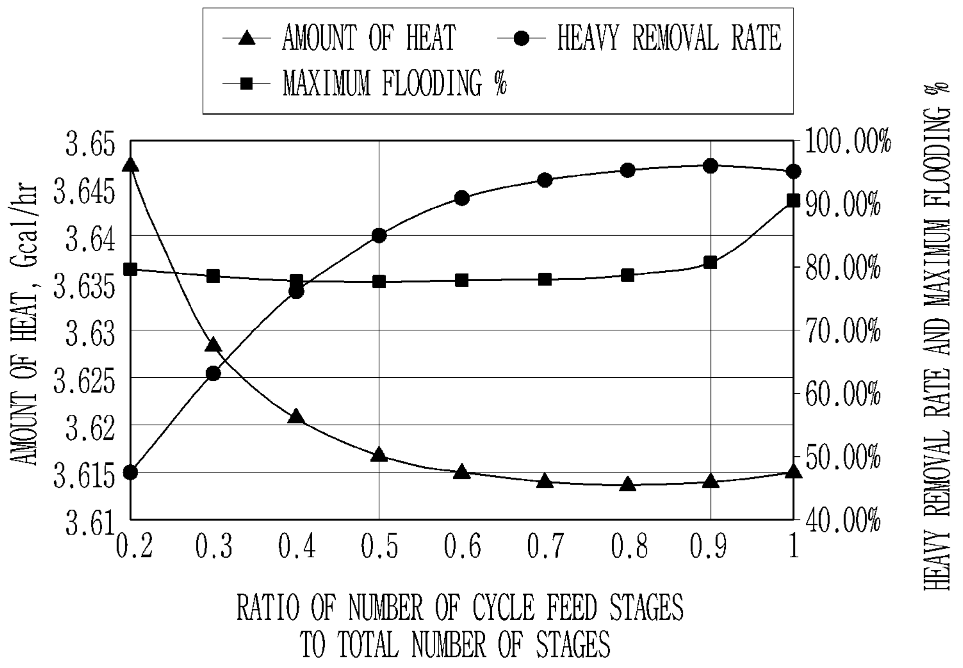
FIG. 3 is a graph illustrating an amount of heat, a heavy removal rate, and a maximum flooding % depending on a change in ratio of the number of cycle feed stages to the total number of stages when target substrates are supplied through a middle inlet according to an exemplary embodiment of the present disclosure.

FIG. 3 is a graph illustrating an amount of heat, a heavy removal rate, and a maximum flooding % depending on a change in ratio of the number of cycle feed stages to the total number of stages when the target substrates are supplied through the middle inlet according to an exemplary embodiment of the present disclosure.

In FIG. 3, concerning the packings stacked in the column, a packing HETP is 0.5 m, a packing diameter is 1.6 m, and a packing height is 5 m. In addition, the target substances were supplied into the lower inlet at a flow rate of 390 kg/hr, and a ratio of an amount of 2-EHEL supplied through the upper inlet to an amount of 2-EHEL injected through the lower inlet was 0.42.

The ratio of the number of cycle feed stages to the total number of stages indicates a unit position where the target substances are supplied through the middle inlet. The closer the ratio is to 0, the closer the unit position is to an upper end of the column, while the closer the ratio is to 1, the closer the unit position is to a lower end of the column.

Referring to FIG. 3, as the ratio of the number of cycle feed stages to the total number of stages increased, that is, as the unit position was closer to the lower end of the column, the amount of heat (duty) decreased while the heavy removal rate increased, and as a result, the removal efficiency of 90% or more was obtained when the ratio was 1. In addition, it was confirmed that the maximum flooding % was maintained at about 80%, and increased to almost 90% when the ratio of the number of stages at the position of the middle inlet to the total number of stages increased from 0.9 to 1.

The maximum flooding % is an index used in operating the column, and is a value calculated according to the flow rates of gas and liquid present inside the column and the packing or tray characteristics of inside the column. Since separation efficiency may decrease when the maximum flooding % exceeds 80%, the column was operated in such a manner that the maximum flooding % is 80% or less. To this end, in an exemplary embodiment of the present disclosure, the middle inlet may be positioned to have a ratio of the number of cycle feed stages to the total number of stages of 0.8 or less. In order to obtain a heavy removal rate of 90% or more, the ratio of the number of cycle feed stages to the total number of stages may be 0.6 or more. That is, according to an exemplary embodiment of the present disclosure, the ratio of the number of cycle feed stages to the total number of stages may be 0.6 or more and 0.8 or less.

Figure 4:
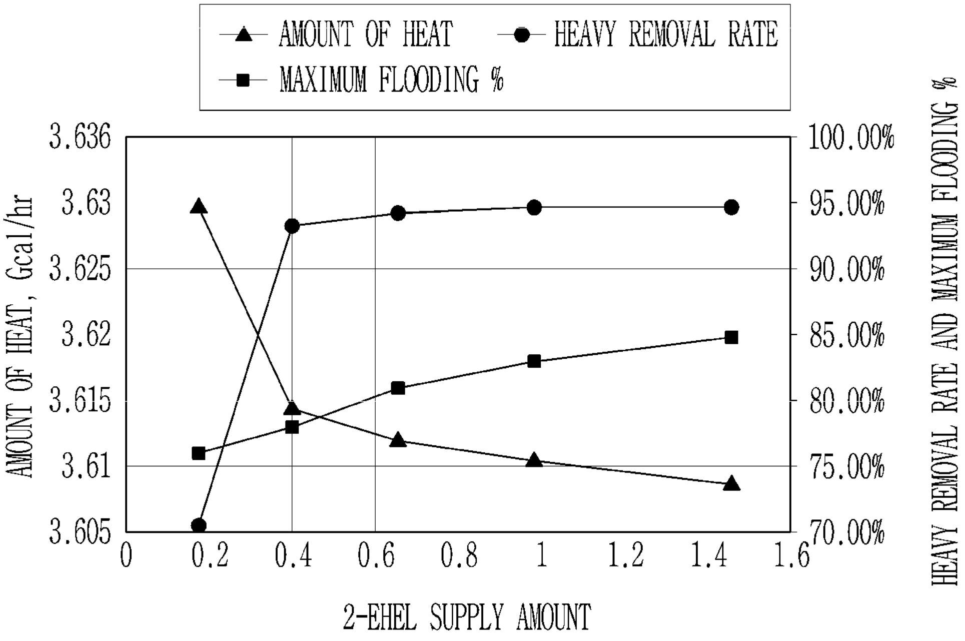
FIG. 4 is a graph illustrating an amount of heat, a heavy removal rate, and a maximum flooding % depending on a change in ratio of an amount of 2-EHEL supplied through an upper inlet to an amount of 2-EHEL injected through a lower inlet according to an exemplary embodiment of the present disclosure.

FIG. 4 is a graph illustrating an amount of heat (duty), a heavy removal rate, and a maximum flooding % depending on a change in ratio of an amount of 2-EHEL supplied through the upper inlet to an amount of 2-EHEL injected through the lower inlet according to an exemplary embodiment of the present disclosure.

In FIG. 4, concerning the packings stacked in the column, a packing HETP is 0.5 m, a packing diameter is 1.6 m, and a packing height is 5 m. A ratio of the number of cycle feed stages to the total number of stages is 0.7.

Referring to FIG. 4, it can be seen that the amount of heat rapidly decreased when the ratio of the amount of 2-EHEL supplied through the upper inlet to the amount of 2-EHEL injected through the lower inlet increased from 0.2 to 0.4, but thereafter, the amount of heat decreased slowly.

In addition, the heavy removal rate rapidly increased when the ratio of the amount of 2-EHEL supplied through the upper inlet to the amount of 2-EHEL injected through the lower inlet increased from 0.2 to 0.4, but thereafter, the heavy removal rate was constantly maintained at about 95% even though the ratio increased.

In addition, it was confirmed that the maximum flooding % increased steadily as the ratio increased, and the maximum flooding % exceeded 80% when the ratio of the supplied amount of 2-EHEL exceeded 0.6. Since separation efficiency decreases when the maximum flooding % exceeds 80%, the ratio of the supplied amount of 2-EHEL according to an exemplary embodiment of the present disclosure is preferably 0.4 to 0.6.

Figure 5:
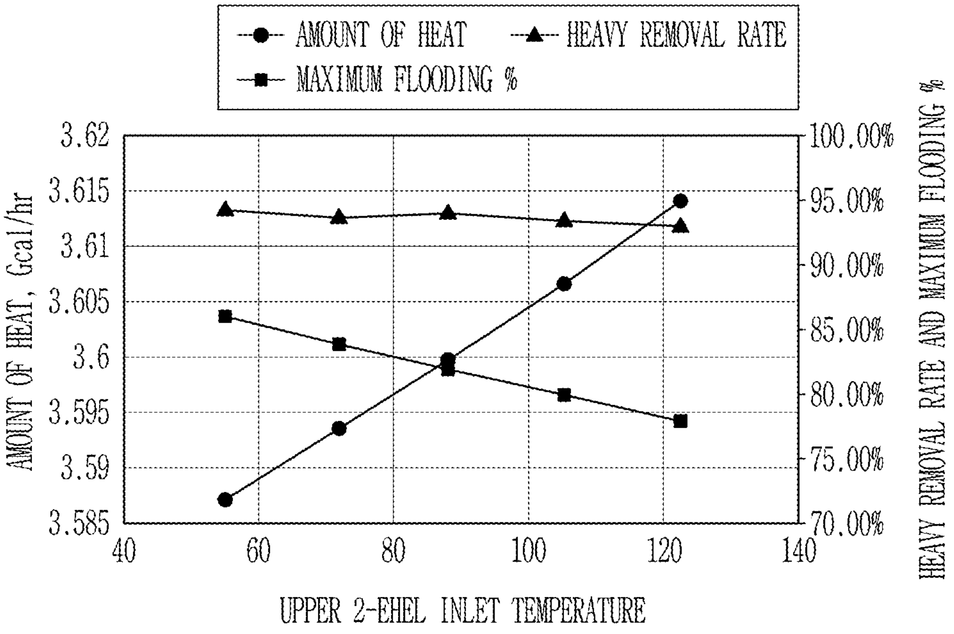
FIG. 5 is a graph illustrating an amount of heat, a heavy removal rate, and a maximum flooding % depending on a change in temperature at which 2-EHEL is supplied through the upper inlet according to an exemplary embodiment of the present disclosure.

FIG. 5 is a graph illustrating an amount of heat, a heavy removal rate, and a maximum flooding % depending on a change in temperature at which 2-EHEL is supplied through the upper inlet according to an exemplary embodiment of the present disclosure.

In FIG. 5, in the column, a packing HETP is 0.5 m, a packing diameter is 1.6 m, and a packing height is 5 m. In addition, the target substances were supplied into the lower inlet at a flow rate of 390 kg/hr, and a ratio of an amount of 2-EHEL supplied through the upper inlet to an amount of 2-EHEL injected through the lower inlet was 0.42. A ratio of the number of cycle feed stages to the total number of stages was 0.7.

Referring to FIG. 5, it can be seen that as the temperature at which 2-EHEL is supplied through the upper inlet increases, the amount of heat constantly increases, while the maximum flooding % decreases slowly, and it can also be seen that the maximum flooding % becomes 80% or less when the supply temperature is higher than or equal to 120° C. In addition, it can be seen that the heavy removal rate is constantly maintained between 90% and 95%.

Therefore, 2-EHEL supplied through the upper inlet is preferably supplied at a temperature of 120° C. or higher so that the maximum flooding % is 80% or less.

Figure 6:
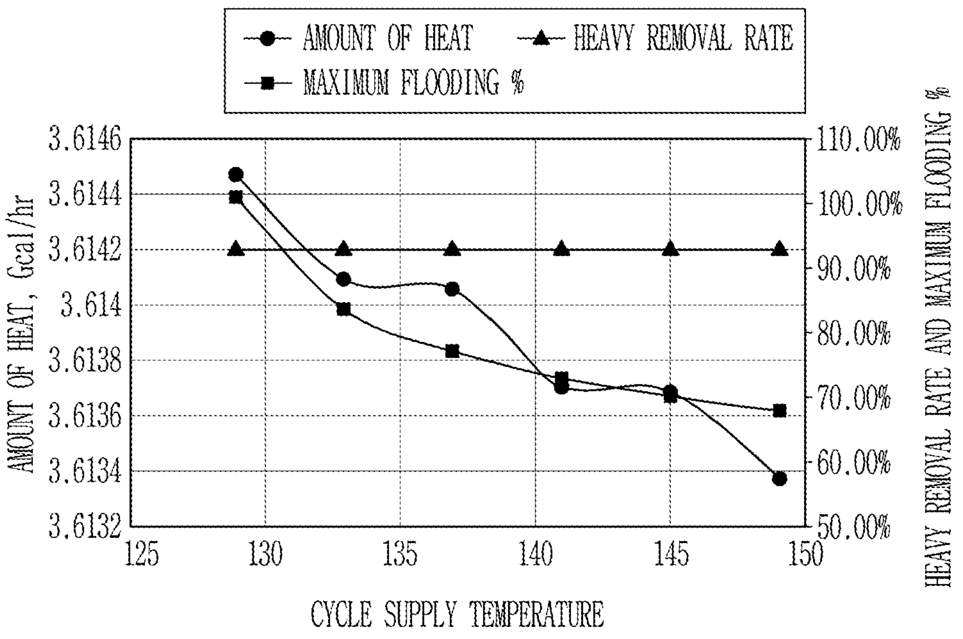
FIG. 6 is a graph illustrating an amount of heat, a heavy removal rate, and a maximum flooding % depending on a change in temperature at which 2-EHEL is supplied through the middle inlet according to an exemplary embodiment of the present disclosure.

FIG. 6 is a graph illustrating an amount of heat, a heavy removal rate, and a maximum flooding % depending on a change in temperature at which 2-EHEL is supplied through the middle inlet according to an exemplary embodiment of the present disclosure.

In FIG. 6, in the column, a packing HETP is 0.5 m, a packing diameter is 1.6 m, and a packing height is 5 m. In addition, the target substances were supplied into the lower inlet at a flow rate of 390 kg/hr, and a ratio of an amount of 2-EHEL supplied through the upper inlet to an amount of 2-EHEL injected through the lower inlet was 0.42. A ratio of the number of cycle feed stages to the total number of stages was 0.7.

Referring to FIG. 6, it can be seen that as the temperature at which 2-EHEL is supplied through the middle inlet increases, the amount of heat and the maximum flooding % decrease, while the heavy removal rate is constantly maintained at a level of 90%.

Since the increase in temperature at which 2-EHEL is supplied through the middle inlet greatly reduces the amount of heat and the maximum flooding % while maintaining the heavy removal rate at 90% or more, the column may be operated in a state where the temperature at which 2-EHEL is supplied through the middle inlet is higher than or equal to 135° C.

As described above, by using the evaporator according to an exemplary embodiment of the present disclosure, a heavy removal rate of 92.8%, which is increased as compared with 16.4% of the conventional evaporator, was obtained at 3.6 Gcal/hr, which is the same amount of heat as that in the conventional evaporator.

In addition, in order to obtain a heavy removal rate of 90% or more, a conventional distillation column requires an amount of heat of 5.5 Gcal/hr or more, whereas the evaporator according to an exemplary embodiment of the present disclosure was able to obtain a heavy removal rate of 90% or more at 3.6 Gcal/hr.

Although the preferred exemplary embodiment of the present disclosure has been described above, the present disclosure is not limited thereto, and various modifications may be made within the scope of the claims, the detailed description of the invention, and the accompanying drawings. It goes without saying that such modifications also fall within the scope of the present disclosure.

The invention claimed is:

1. An evaporator comprising: a column in which a plurality of packings are stacked; an upper inlet, a middle inlet, and a lower inlet provided in an upper portion, a middle portion, and a lower portion of the column, respectively; an upper outlet and a lower outlet provided in the upper portion and the lower portion of the column, respectively; a pump connected to the lower outlet; a heater connected between the pump and the middle inlet; and a first supply unit and a second supply unit supplying target substances to the column, wherein the first supply unit is connected to the upper inlet, and the second supply unit is connected to the lower inlet, wherein gas is injected together with the target substances into the lower inlet, wherein the first supply unit includes a first storage tank storing the target substances to be separated, and the target substances stored in the first storage tank is supplied from the first storage tank into the upper inlet, and the second supply unit includes a second storage tank storing gas and the target substances, and the gas and the target substances stored in the second storage tank are supplied from the second storage tank into the lower inlet through a conduit between the second supply unit and the lower inlet.

2. The evaporator of claim 1, further comprising:

a first heater positioned between the first supply unit and the column; and a second heater positioned between the second supply unit and the column.

3. The evaporator of claim 1, wherein the column includes:

a first column to which the target substances are supplied from the first supply unit through the upper inlet, and a second column positioned below the first column.

4. The evaporator of claim 3, wherein the first column and the second column include a plurality of structured packings, the number of packing stages of the first column and the number of packing stages of the second column are different from each other.

5. The evaporator of claim 1, wherein substances discharged through the lower outlet are supplied to the column through the middle inlet after passing through the pump and the heater.

6. A separation method using the evaporator of claim 1, the separation method comprising:

injecting target substances into the upper inlet and the lower inlet of the evaporator; and injecting substances discharged through the lower outlet after passing through the column into the middle inlet via the pump and the heater, wherein in the injecting of the target substances into the upper inlet and the lower inlet, gas is injected together with the target substances into the lower inlet.

7. The separation method of claim 6, wherein the target substances include 2-EHEL and heavies.

8. The separation method of claim 6, wherein the gas includes at least one of hydrogen, methane, carbon dioxide, and carbon monoxide.

9. The separation method of claim 6, wherein the heater between the first supply unit and the column heats the substances to be discharged to a temperature of 70° C. to 122° C., and the heater between the second supply unit and the column heats the substances to be discharged to a temperature of 105° C. to 115° C.

* * * * *